United States Patent [19]
Marti

[11] 3,788,432
[45] Jan. 29, 1974

[54] ELECTRICAL BRAKE ASSEMBLY

[76] Inventor: Milford F. Marti, 608 B Chateau Dr. S.W., Huntsville, Ala. 35801

[22] Filed: Oct. 13, 1972

[21] Appl. No.: 297,331

[52] U.S. Cl. ............................... 188/138, 188/332
[51] Int. Cl. ............................................. F16d 65/34
[58] Field of Search .... 188/331, 332, 335, 138, 164

[56] References Cited
UNITED STATES PATENTS

| | | | |
|---|---|---|---|
| 2,191,188 | 2/1940 | Chambers | 188/138 |
| 2,273,065 | 2/1942 | Penrose | 188/138 |
| 3,677,375 | 7/1972 | Wolf | 188/138 |

*Primary Examiner*—Duane A. Reger
*Attorney, Agent, or Firm*—C. A. Phillips

[57] ABSTRACT

An electrical wheel brake assembly in which the webs of brake shoes and magnetically operated lever arm which operates the brake shoes are held in a planer alignment between and supported by a pair of parallel spaced, interconnected, supporting plates, in turn supported by an axle, or spindle.

11 Claims, 3 Drawing Figures tion, extending the requirement to vehicles of lower weight than previously required and requiring in some instances that all wheels of the towed vehicles be equipped with brakes. The latter requirement is in contrast to past practices in which, for example, mobile homes having a total of six or eight wheels would have brakes on only two or four of them. The result is that there has currently appeared a substantially increasing need for electrically equipped brake assemblies. This, of course, is in turn bringing about significantly increased costs of such vehicles, particularly since existing type electrical brakes have a good many components and are fairly expensive to manufacture.

ELECTRICAL BRAKE ASSEMBLY

BACKGROUND OF THE INVENTION

Towed vehicles weighing more than certain state regulated weights are required to have brakes which may be operated from the cab of the towing vehicle. In general, such vehicles as mobile homes, recreational trailers and certain other towed vehicles such as boat trailers employ electrically operated brakes and such type brakes have been in use for a number of years. Typical illustrations of such brakes are contained in U.S. Pats. Nos. 3,134,463, and 3,244,259.

Recently there has been a movement reflected by S.A.E. and Government regulations to require a greater usage of brakes on towed vehicles, extending the requirement to vehicles of lower weight than previously required and requiring in some instances that all wheels of the towed vehicles be equipped with brakes. The latter requirement is in contrast to past practices in which, for example, mobile homes having a total of six or eight wheels would have brakes on only two or four of them. The result is that there has currently appeared a substantially increasing need for electrically equipped brake assemblies. This, of course, is in turn bringing about significantly increased costs of such vehicles, particularly since existing type electrical brakes have a good many components and are fairly expensive to manufacture.

In addition to the substantial costs of existing type electrical brakes, it has been found that in many instances their operation has been less than satisfactory. For example, it has been found that balanced loading of brake lining against brake drums is not often achieved, resulting in a deterioration in available braking force.

Another problem has been that excessive forces are concentrated on certain components of the operating mechanism causing deformation or failure of components, resulting in complete or nearly complete brake failure.

SUMMARY OF THE INVENTION

Accordingly, the objects of the present invention are to provide a new and improved electrical brake assembly which is less expensive to manufacture than previous electrical brake assemblies and yet is of more reliable construction and will provide greater assurance of uniform braking action over the full anticipated life of the brake assembly.

DESCRIPTION OF THE PREFERRED EMBODIMENT

Figure 1:
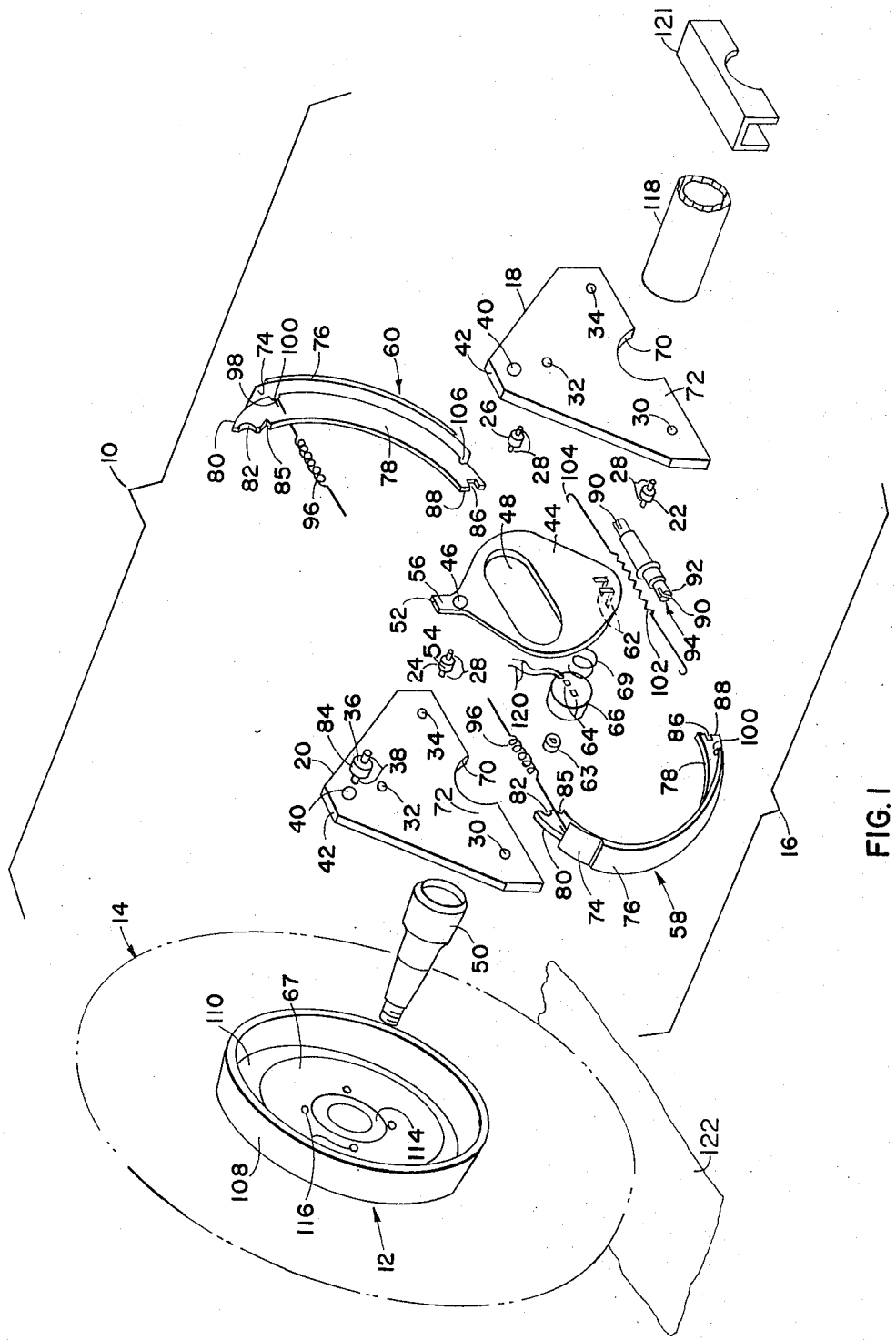
FIG. 1 is an exploded view of an embodiment of the invention.

Electric brake assembly 10 is illustrated as a part of hub and drum assembly 12, typically adapted to be attached to a wheel and tire assembly 14 of a towable vehicle such as a mobile home. The non-rotating components of brake assembly 10 are shown opposite the parenthesis designated by the numeral 16 in FIG. 1. Triangular-shaped plates 18 and 20, referred to herein as "backing plates," are coupled together in a spaced relationship by spacer rivets 22, 24 and 26, having end regions 28 adapted to accept and extend through aligned apertures 30, 32 and 34, spaced inward of truncated corners of plates 18 and 20. Plates 18 and 20 are further connected by anchor pin 36, of larger diameter than spacer rivets 22, 24 and 26, having end regions 38 adapted to fit and extend through aligned bores 40, centrally formed near upper edge 42 of each of plates 18 and 20. Actuating lever arm 44 is pivotable supported by aperture 46 on upper rivet 24 between backing plates 18 and 20. It is of a thickness between 0.180 and 0.190 inches, is essentially eliptical in form and is provided with an intermediate elongated opening 48 which facilitates freedom of movement about spindle 50 to which plates 18 and 20 are to be welded. Aperture 46 is centrally positioned near upper end 52 of lever arm 44, being dimensioned to accept the enlarged diameter portion 54 of river 24. Rectangular shaped expansion lug 56 is disposed vertically above pivotal aperature 46 of lever arm 44 and is adapted to actuate brake shoes 58 and 60 is a manner to be further described.

A pair of inwardly disposed spaced fingers 62 are integrally formed normal to lower portion of lever arm 44 and are adapted to freely accept mating apertures 64 provided in electromagnet 66. Electromagnet 66 is urged into spring biased engagement with armature plate or disc 67 of hub and drum assembly 12, in a manner to be further described, by compression spring 69 retained about fingers 62, by retaining plug 63. Fingers 62 are pierced out of the surface of lever arm 44 and thus can be made in the same operation as operator 46 and opening 48 when lever arm 44 is blanked progressively through the die from strip steel. When assembled, the three spacer rivets 22, 24 and 26, in addition to anchor pin 36, are inserted through apertures 30, 32, 34 and 40 respectively, and are firmly staked in one operation. In this fashion, an integral structure is formed with the plates spaced apart approximately 0.200 to 0.220 inches.

Upon assembly, support plates 18 and 20 are axially and radially aligned and securely welded to spindle 50 or axle tube 118 by welds 68 (FIG. 3) through mating semicircular mounting notches 70 centrally formed in lower portion 72 of plates 18 and 20.

Brake assembly 10 has two conventional brake shoes 58 and 60, each of which includes arcuately-shaped table 74 and outer brake lining 76, and a centrally supported inner, generally upright, web 78.

Anchor pin end 80 of each of the webs 78 is provided with a semicircular notch 82 adapted to engage the central diameter portion 84 of anchor pin 36. A right angle notch 85 is vertically disposed below notch 82, being dimensioned to mate with actuating lug 56 of lever arm 44, previously described. Rectangular notch 86, centrally formed in lower end 88 of each web 78 is adapted to interengage with similarly dimensioned slot 90 formed in the ends 92 of conventional brake adjustment assembly 94.

When assembled, brake shoes 58 and 60 are substantially supported in a precise anial alignment by webs 78, being adapted to closely fit between backing plates 18 and 20 in regions "A," "B," "C," and "D." Semicircular notches 82 in ends 80 of webs 78 are maintained in spring biased engagement on opposite sides of anchor pin 36 by a pair of like tension springs 96. Each of springs 96 is provided with hooked ends 98 which are engaged in notched holes 100 in webs 78 of brake shoes 58 and 60.

Brake shoes 58 and 60 coact at lower ends 88 through conventional brake adjustment assembly 94, being maintained in connecting engagement by tension spring 102 provided with hooked ends 104 whereby it is coupled between opposing holes 106 notched in webs 78. The rotating elements of brake assembly 10 consist of drum 108, drum back 110, armature plate 112 and hub 114. Drum 108 is supported for rotation about brake shoes 58 and 60 by drum back 110 which is conventionally attached or formed together with rotating hub 114. Armature 67 is a ferous, disc-shaped member and is either formed integral with a hub or is a separate disc which is typically attached by rivets 116 to drum back 110. It has a flat face oriented perpendicular to the axis of drum 108 and is axially positioned to normally rotate in low friction contact with electromagnet 66. Hub 114 is rotably supported in a conventional fashion on stub axle 50 by roller bearings and a securing means, not shown. Stub axle 50 in turn, is typically welded to the main axle 118 of the vehicle and extends between stub axles 50 on either side of the vehicle, being normally attached in a conventional fashion through suspension mounting pads 121.

Figure 3:
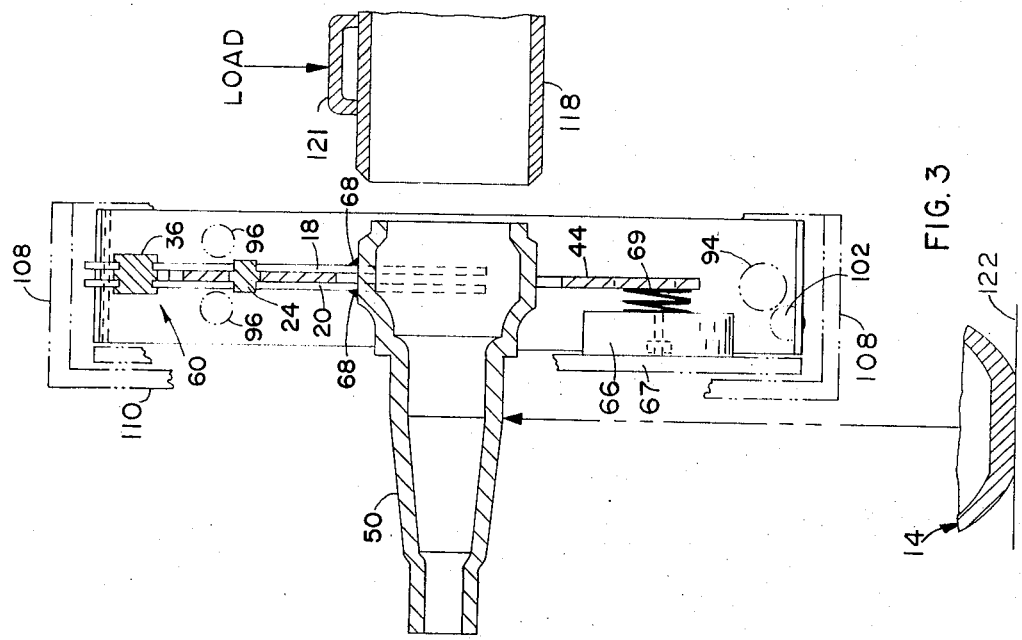
FIG. 3 is a sectional view along lines 3—3 of FIG. 2.
Figure 2:
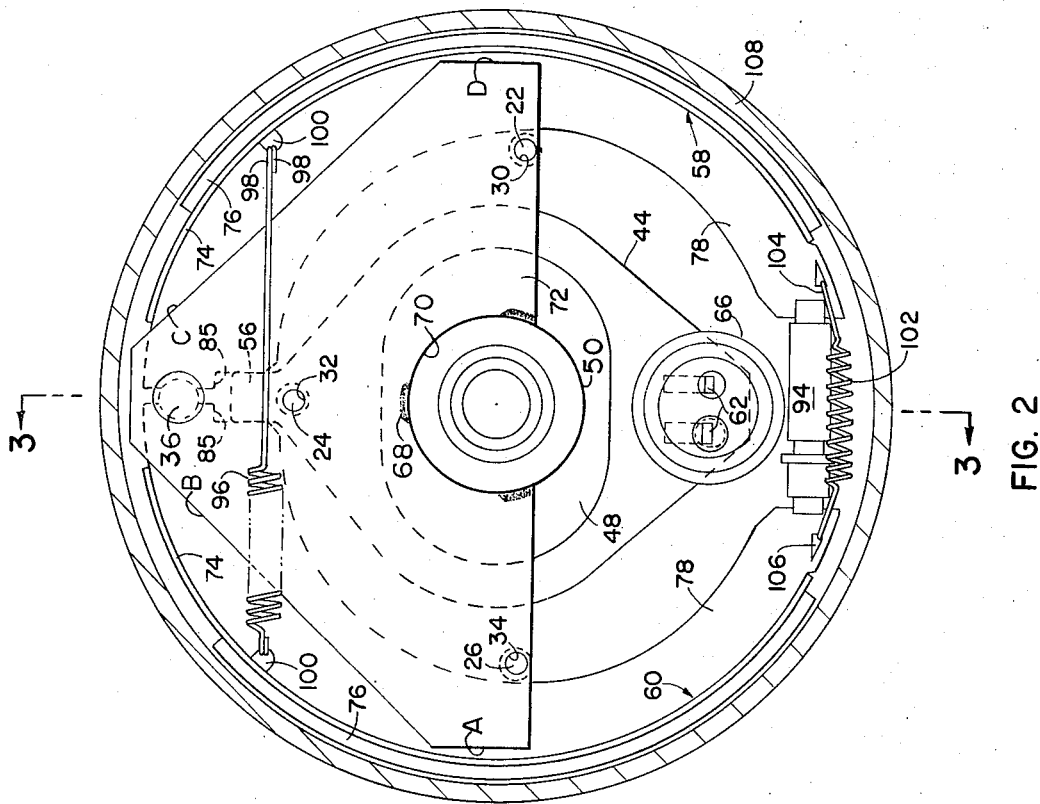
FIG. 2 is an elevation view of an assemblied brake.

Of particular significance is the fact that the invention enables the mounting of the brake assembly further outboard than possible with known design, that is, nearer the bearing journal on which hub and drum assembly 12, and wheel and tire assembly 14, are mounted. In fact, this distance has been reduced by more than one inch over current designs to enable this distance to be typically reduced from 3 11/16 to 2¼ inches. A range of 3 to 2½ inches for this dimension may be achieved with the design of the invention. The significance of this is illustrated in FIG. 3 wherein the downward force of the vehicle load on suspension pad 121 is supported by the opposite or upward force applied to spindle 50 by wheel and tire assembly 14 supported by ground 122. The result is that there is significantly less flexure of the axle assembly between the points of mounting of the brake assembly and the drum assembly and this assures much better alignment between the brake shoes and the brake drum and thus greater wear.

OPERATION

Assume, initially, that drum 108, and the wheel 14 to which it is connected on a vehicle, is rotating in a counter-clockwise direction representing forward motion of the vehicle. In order to apply braking force, power is applied to input leads 120 of electromagnet 66 through a switch normally located in the cab of a tractor towing the vehicle including brake assembly 10. A magnetic flux is then produced by electromagnet 66 which causes it to be attracted into a high friction contact with armature plate 67 and this in turn causes lever arm 44 to be rotated about rivet 24 a few degrees in a counter-clockwise direction.

In this manner, actuating lug 56 of lever arm 44 is turned to apply a force upon engaging surface 85 at the top end of web 78 of (primary) shoe 58, causing shoe 58 to be moved radially outward into frictional engagement with inside diameter of drum 108. This in turn causes the bottom end 88 of web 78 of shoe 58, to apply a radial pushing force through brake adjustment assembly 94 to secondary shoe 60 and thus both brake shoes coact to apply a substantial braking outward radial force to brake drum 108 and thus to wheel 14 of the vehicle attached thereto. The result is, of course, that a braking force is transmitted through anchor pin 36, to backing plates 18 and 20 to axles 50 and 118 and then to the supported vehicle causing it to be brought to a halt. Thus this braking force is transmitted from brake shoes 58 and 60 to the axle 50 along a plane perpendicular to the axle 50 and which is normal to the surface of the shoes 58 and 60 and which also intersects the center line of same.

Assume next that a braking action is to be applied to a vehicle moving in the opposite direction wherein brake drum is initially turning in a clockwise direction. Lever arm 44 would then be pivoted in a clockwise direction by armature disc 67 to initially cause lug 56 to engage upper surface 85 of shoe 60 and cause shoe 60 to move into engagement with brake drum 108. This action in turn causes the lower end of brake shoe 60 to apply force to drum 108 which is transmitted to shoe 60 which coacts with shoe 58 to apply an increased braking effect, in life manner as described above, to again bring the vehicle to a halt.

SUMMARY OF FEATURES

It will be readily seen from the drawings and the foregoing description that the electrical braking system disclosed herein meets the objectives set forth for it. Backing plates 18 and 20 and lever arm 44, principal components of this assembly, can be simply formed by stamping them out of strip coil metal plate. Being delta or triangular shaped, uniquely to facilitate the stamping of the backing plates from sheet material results in minimum waste of material by producing two per stroke of the press. While not shown, guide holes may be provided in the backing plates to facilitate location during welding to the axle 118 or spindle 50. Further, where additional stiffening or flatness is desired, ribs may be formed outwardly into the back of each backing plate.

The remaining components, other than backing plates and lever arm, in general, are already being manufactured and are readily available at relatively low cost. The total number of components is a reduction by approximately 30 percent over that normally required for electrical brake assembly, of other designs.

Lever arm 44 is supported in a balanced fashion by rivet 24 between plates 18 and 20. By being thus mounted upon a pivoting support which has dual supports or in double shear and therefore there is provided substantially greater support than typically found wherein the lever pivot is singly supported at one end and in single shear and subject to lever action. This means that not only is there much less chance that the lever pivot will break but much less chance, in fact slight if any, that it or the support area will deform and thus produce a malfunction of the lever arm operating the brake shoes because of the balanced center line of leads and actions. The same added support is provided anchor pin 36 wherein it and its dual supporting structure, plates 18 and 20, provide a more rugged and durable and easily assembled structure.

Since plates 18 and 20 provide a guide insuring planer operation of lever arm 44, it is assured that lug 56 on lever arm 44 will provide a desired direction of force on shoes 58 and 60 which is normal to bands 74 and linings 76 of brake shoes 58 and 60.

Plates 18 and 20 also provide a guide in which the webs of brake shoes 58 and 60 operate and thus there is prevented the tendency of the brake shoes to apply an uneven engaging surface to the working surface of drum 108 and maintain this same position when not engaged. Therefore adjustment of lining clearance to drum 108 inside diameter can be minimized and travel to full engagement lessened. Thereby improvement of field life is offered without repeated adjustments. This tendency has heretofore been a substantial problem with electrical brake designs wherein the brake shoes and lever arm are both supported from a single side of a single plate, which plate deflects with each brake application and is not infrequently distorted because of heat and forces from the brakes being transmitted to the plate. In some instances, small distortions and stresses arise from the manufacturing process which are then amplified by heat generated by usage. In the case of the present invention, employing dual plates, and wherein the lever arm and brake shoes are orientated in a balanced fashion, on a given centerline of forces and reactions such heating does not tend to produce distortions which have such an effect. For one thing, with the dual plates, there is greater ventilation offered and the conductivity of the heat away from the brakes to the axle and for another, the cross-support provided between them provide substantial resistance to deformation of the plates.

As still another advantage of the present invention, it enables the shoes to be aligned in use in the same manner in which they are aligned in the final stage of manufacture, that is during the grinding of the lining to the prescribed tolerances. Thus, in this grinding procedure, the webs of the shoes are normally used as a reference plane, the webs being gripped by the grinding fixture. Similarly in the present brake assembly, the webs are used as the alignment reference since the webs fit between backing plates 18 and 20 in an aligned position. In contrast, prior braking systems have not used the webs as reference alignment means, instead they have used edges of the table of the brake shoe assemblies. The result has been that not infrequently, misaligned brake assemblies are produced, requiring additional grinding of the linings in order that the brake shoes will fit inside of the brake drums with which they are to be used.

The overall result is that the present invention clearly provides a new electrical braking system with improved performance and accomplishes this at a lower cost of manufacture.

What is claimed is:

1. An electrical brake assembly adapted to be employed with a brake drum having cooperative armature plate on the inner end surface of the drum comprising:
    a pair of rigidly connected, spaced, plates adapted to be positioned parallel to said armature plate of said brake drum;
    a pair of brake shoes, each having an arcuately outer-shaped lining bearing portion adapted to engage the inner peripheral wall of said drum and an inner web perpendicular to said lining bearing portion and adapted to extend between and be aligned by a portion of the inner walls of said plates;
    spring bias means connected to said brake shoes for normally biasing said lining bearing portion of said brake shoes in a contracted position wherein said lining bearing portions are withdrawn from engagement with said inner peripherial wall of said drums;
    brake actuating means comprising a lever intermediately attached to and between said plates and between said webs and said brake actuating means having an electromagnet extending from one end of said lever and adapted to frictionally engage said armature plate, and said lever arm having engaging means on the other end of said lever arm adapted to apply a force to an end region of a said web upon said electromagnet being energized and frictionally engaging a rotating said armature plate;
    whereupon said lining bearing portion of said shoes are forced into engagement with said drum.

2. An electrical brake assembly as set forth in claim 1 wherein said electromagnet has at least one mounting slot and said lever has an extending arm adapted to fit into said mounting slot and support said electromagnet.

3. An electrical brake assembly as set forth in claim 1 wherein said spring bias means includes at least one spring interconnecting opposite end regions of webs of said brake shoes.

4. An electrical brake assembly as set forth in claim 3 wherein said spring bias means includes a pair of return springs interconnecting opposite end regions of webs of said brake shoes, one of said springs being positioned on the outside of one of said plates and the other said springs being positioned on the outside of the other of said plates.

5. An electrical brake assembly as set forth in claim 1 wherein said plates are generally triangular and there is included an anchor pin interconnected between two opposite apex regions of said plates, and oppositely positioned ends of webs of said brake shoes rest on said anchor pin when in a neutral position.

6. An electrical brake assembly as set forth in claim 5 wherein said lever is generally oval in configuration and includes a central aperture adapted to fit around an axle in turn adapted to rotably support said drum.

7. An electrical brake assembly as set forth in claim 1 further comprising an axle assembly adapted to rotably support said drum and rigidly support said plates, whereby braking force is transmitted substantially within a plane between said brake shoes, through said plates, to said axle assembly, which plane is perpendicular to the axis of said drum and said axle assembly and bisects said bearing portion of said brake shoes.

8. An electrical brake assembly as set forth in claim 7 wherein the center of support of said drum on said axle assembly is 2 to 2½ inches from the center of support of said plates on said axle assembly.

9. An electrical brake assembly as set forth in claim 7 wherein said plates are welded to a brake assembly supporting structure.

10. An electrical brake assembly as set forth in claim 7 wherein said plates each include an aperature adapted to fit around at least a portion of said axle.

11. An electrical brake assembly as set forth in claim 10 wherein said plates are generally triangular and said apertures of said plates are formed in the center of the base of the triangular configured plates.

* * * * *